No. 825,295. PATENTED JULY 10, 1906.
L. E. BLANCHARD.
SPEEDOMETER.
APPLICATION FILED MAY 25, 1905.

4 SHEETS—SHEET 1.

Witnesses.
C. H. Garnett
J. Murphy

Inventor.
Leon E. Blanchard
by Jas. H. Churchill
Atty.

No. 825,295. PATENTED JULY 10, 1906.
L. E. BLANCHARD.
SPEEDOMETER.
APPLICATION FILED MAY 25, 1905.

4 SHEETS—SHEET 2.

Witnesses.
Inventor.

No. 825,295. PATENTED JULY 10, 1906.
L. E. BLANCHARD.
SPEEDOMETER.
APPLICATION FILED MAY 25, 1905.

4 SHEETS—SHEET 3.

Witnesses
Inventor.
Leon E. Blanchard

No. 825,295. PATENTED JULY 10, 1906.
L. E. BLANCHARD.
SPEEDOMETER.
APPLICATION FILED MAY 25, 1905.

4 SHEETS—SHEET 4.

Witnesses.
C. H. Garrett
J. Murphy

Inventor:
Leon E. Blanchard
By Jas. H. Churchill
Atty.

UNITED STATES PATENT OFFICE.

LEON E. BLANCHARD, OF BOSTON, MASSACHUSETTS, ASSIGNOR TO ROLLINS MANUFACTURING COMPANY, OF BOSTON, MASSACHUSETTS, A COPARTNERSHIP.

SPEEDOMETER.

No. 825,295.

Specification of Letters Patent.

Patented July 10, 1906.

Application filed May 25, 1905. Serial No. 282,168.

*To all whom it may concern:*

Be it known that I, LEON E. BLANCHARD, a citizen of the United States, residing in Boston, in the county of Suffolk and State of Massachusetts, have invented an Improvement in Speedometers, of which the following description, in connection with the accompanying drawings, is a specification, like characters on the drawings representing like parts.

This invention relates to a speedometer especially adapted for use on automobiles and like vehicles, and has for its object to provide a simple and efficient instrument by means of which the speed of the vehicle may be denoted and the distance traveled indicated or registered. For this purpose the instrument is provided with a dial having on it preferably two scales or sets of graduations, with which coöperate pointers or indexes, one pointer coöperating with one set of graduations to indicate the speed of the vehicle and the other pointer coöperating with the other set of graduations to indicate the mileage or distance traveled. A registering mechanism may also be provided to register the distance traveled, which has a greater range than the distance graduations on the dial. Provision is made for setting one of the pointers to zero, as will be described. These and other features of this invention will be pointed out in the claims at the end of this specification.

Figure 1:
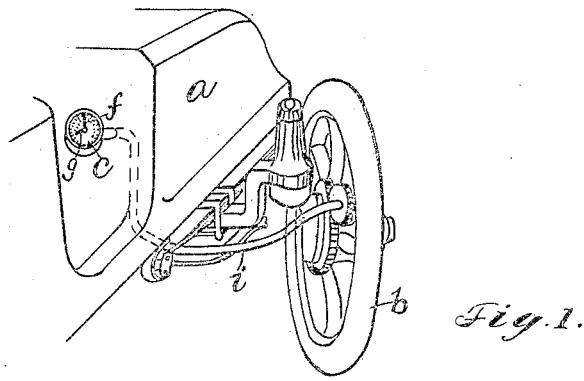
Figure 2:
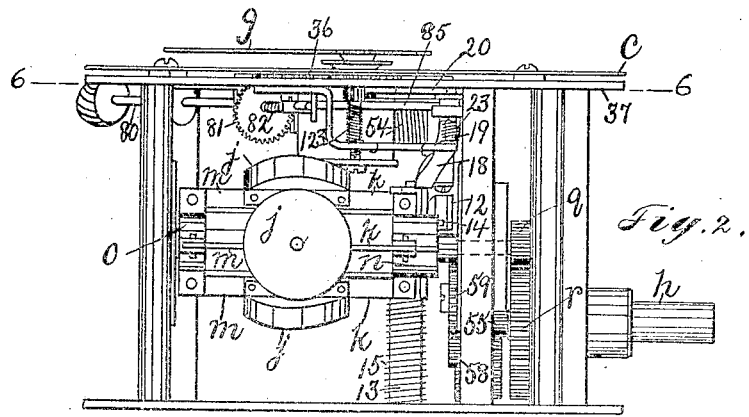
Figure 3:
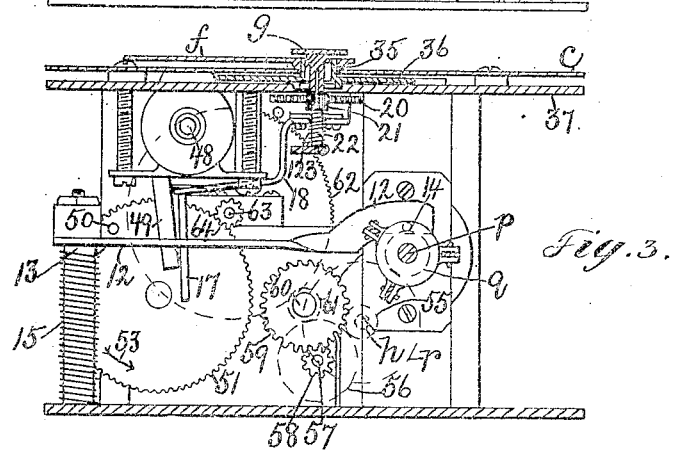
Figure 4:
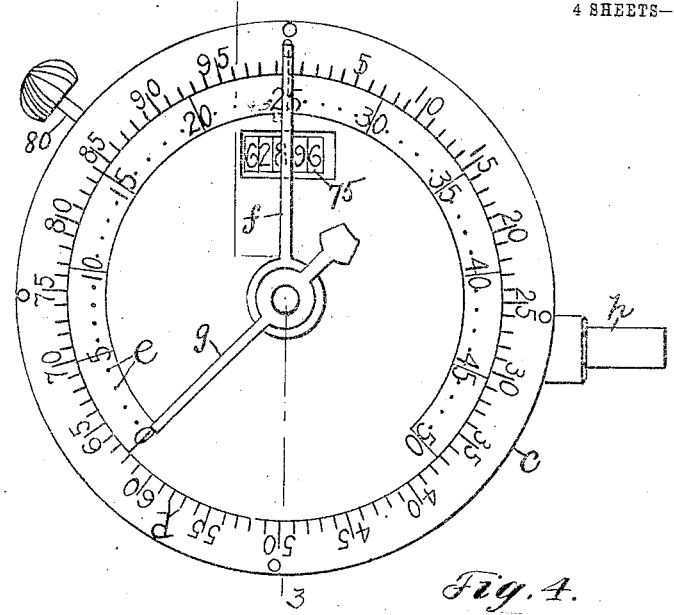
Figure 5:
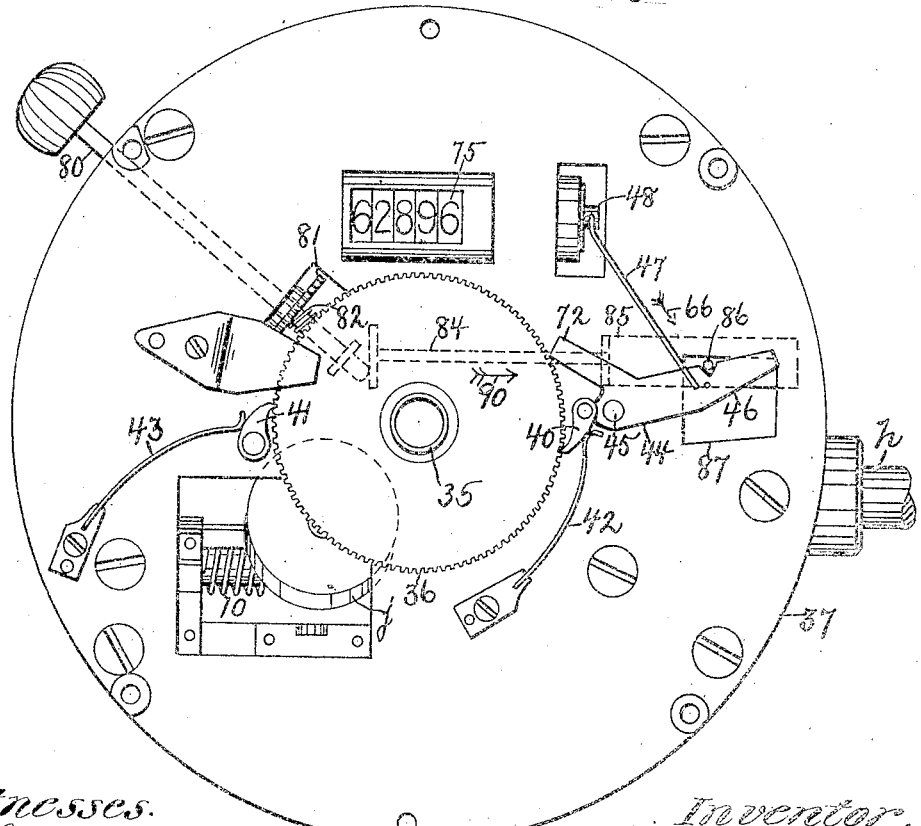
Figure 6:
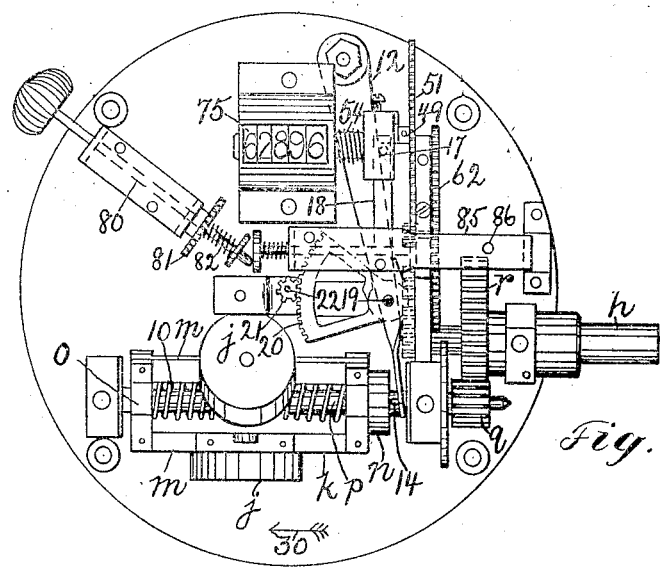
Figure 7:
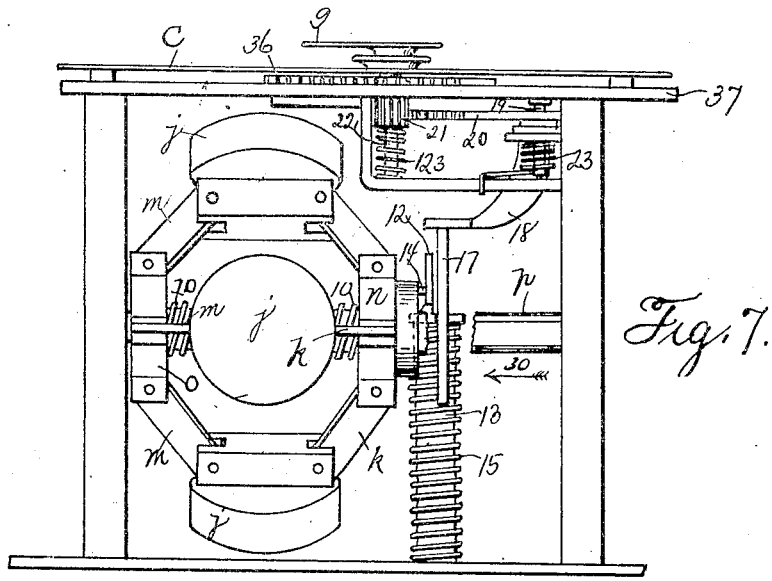
Figure 8:
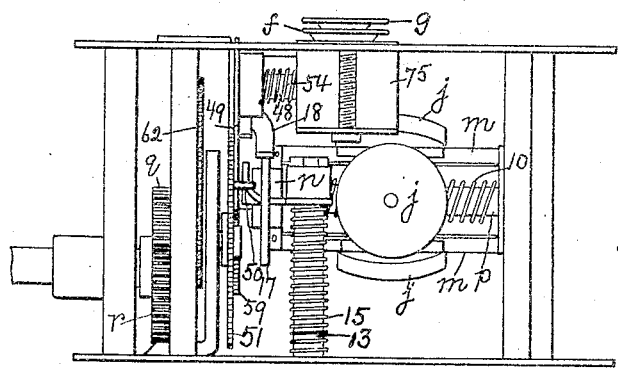
Figure 9:
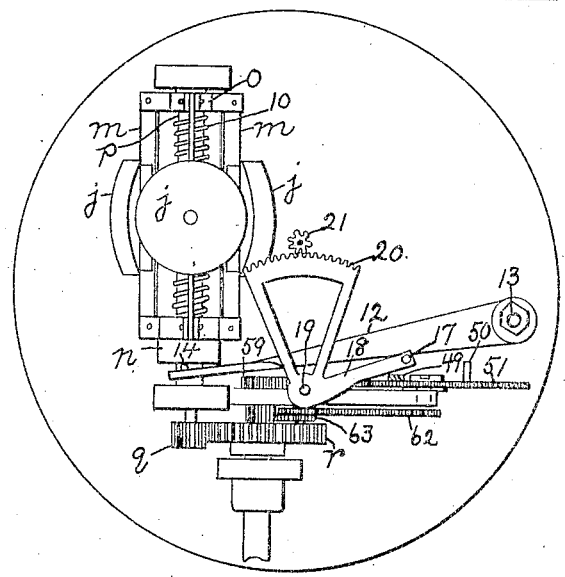
Figure 10:
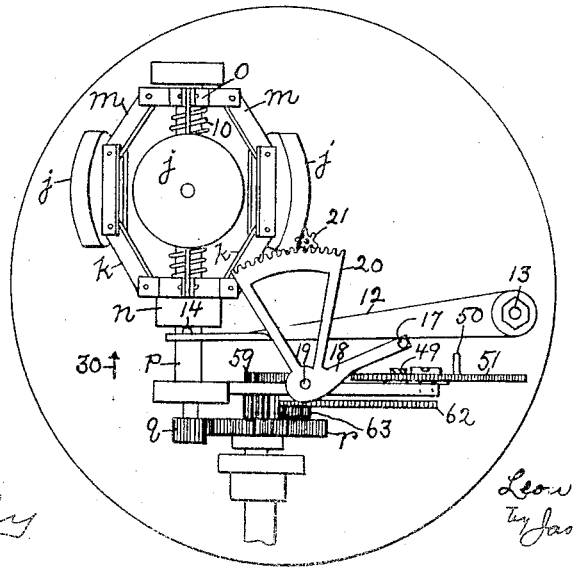

Figure 1 represents a portion of an automobile provided with a speedometer embodying this invention; Fig. 2, a side elevation, and Fig. 3 a vertical section, of the speedometer shown in Fig. 1; Fig. 4, a plan view of a speedometer shown in Fig. 2; Fig. 5, a plan view, on an enlarged scale, of the speedometer shown in Fig. 2 with the pointers and dial removed; Fig. 6, a horizontal section on the line 6 6, Fig. 2; and Fig. 7, a detail in elevation with parts omitted to be referred to; Fig. 8, a side elevation looking toward the right in Fig. 3; Figs. 9 and 10, details in plan, on an enlarged scale, to more clearly illustrate the operation of the apparatus.

Referring to the drawings, $a$ represents a vehicle, such as an automobile, which is provided with a speedometer operatively connected with one of its wheels $b$. The speedometer referred to in accordance with this invention is provided with a dial $c$, (see Fig. 4,) having two scales or sets of graduations, herein shown as lines $d$ and dots $e$, which are concentrically arranged about the dial.

The graduations $d$ $e$ indicate predetermined distances—such, for instance, as miles—and have coöperating with them two pointers or indexes $f$ $g$, the movement of one of which, as $g$, is controlled by a governor, as will be described, operated from a main shaft $h$, driven from a wheel $b$ of the vehicle by a flexible shaft $i$ or in any other suitable manner, while the movement of the other pointer $f$ is effected from the main shaft, as will be described. The governor referred to may be made as herein shown and consists of a plurality of weights $j$, herein represented as three in number, to which are pivotally attached one end of links or levers $k$ $m$, (see Figs. 2, 6, and 7,) having their other ends pivotally connected to collars $n$ $o$ on a shaft $p$, which is driven from the main shaft $h$ by a pinion $q$ and gear $r$. (Shown best in Fig. 6.) The collar $o$ is fast on the shaft $p$, while the collar $n$ is loose thereon, and when the shaft $p$ is stationary the levers or links $k$ $m$ are brought into substantially a straight line (see Figs. 7, 8, and 9) by a helical spring 10, which encircles the shaft $p$ and bears against the collars $n$ $o$. As the shaft $p$ is rotated the weights $j$ are thrown outward by centrifugal force, as represented in Figs. 7 and 10, and the levers or links $k$ $m$ assume a position at an angle to each other and move the loose collar $n$ toward the fast collar $o$ against the action of the spring 10. The loose collar $n$ constitutes a movable member of the governor and has coöperating with it a lever 12, (see Figs. 3, 6, 7, 9, and 10,) pivotally mounted on a post 13 and provided, as shown, with a stud or projection 14, which is held in engagement with the collar $n$ by a spring 15, (see Figs. 3 and 9,) which encircles the post 13 and is connected with the lever 12. The lever 12 controls the movement of the pointer $g$, which may be effected as herein shown, and for this purpose the lever 12 has coöperating with it a rod or pin 17, (see Figs. 9 and 10,) depending from a crank or arm 18 on a vertical rock-shaft 19, provided with a segmental gear 20, which meshes with a pinion 21 on a shaft 22, carrying the pointer $g$.

The shaft 22 is rotated in one direction by a spring 23 encircling it and is rotated in the opposite direction by the governor-spring 10. A spring 123, which encircles the shaft 22, acts to take up the backlash and steady the movement of the pointer $g$. The spring 23 is permitted to act by the lever 12 moving away from the depending pin or rod 17, which takes place when the governor moves the loose collar $n$ in the direction indicated by the arrow 30 in Figs. 6, 7, and 10. It will therefore be seen that the movement of the pointer $g$ is directly responsive to the speed of the shaft $h$, that when said shaft is at rest the pointer $g$ registers with the zero graduation of the inner scale $e$, that rotation of the shaft $h$ effects movement of the pointer $g$ over the scale $e$, that the extent of movement of the pointer is dependent upon the speed of rotation of the shaft $h$ and of the vehicle, and that the position of the pointer corresponds to the speed of the vehicle at any given time, and therefor I prefer to designate the pointer $g$ as the "rate-indicator." The pointer $f$ may be designated the "distance-indicator," as its function is to indicate the distance traveled in a given time. For this purpose the said pointer is intermittently operated, being moved step by step with relation to the second scale or set of graduations $d$. It is designed to have the pointer $f$ move the distance of one graduation for each mile traveled by the vehicle, and this result is accomplished, as herein shown, by mechanism as will now be described. For this purpose the pointer $f$ is frictionally mounted on the hub 35 of a gear 36, concentric with the shaft 22, on which the pointer $g$ is mounted, (see Fig. 3,) and located between the dial $c$ and a top or front plate or disk 37 of the supporting-frame of the instrument. The gear 36 has coöperating with it a push-pawl 40 and a holding-pawl 41, (see Fig. 5,) which are normally held in engagement with the said gear by springs 42 43. The push-pawl 40 is pivoted to a lever 44, which is pivoted at 45 to the plate 37 and has one arm 46 connected by a crank or arm 47 to a rock-shaft 48, provided with a depending crank or arm 49, (see Figs. 3, 8, 9, and 10,) which is extended into the path of movement of a stud or pin 50, projecting from one face of a gear 51, which is driven from the main shaft $h$. For this purpose the main shaft is provided with a pinion 55, (see Figs. 2 and 3,) which meshes with a gear 56 on a shaft 57, provided with a pinion 58 in mesh with a gear 59 on a shaft 60, having a pinion 61, which meshes with a gear 62 on a shaft 63, provided with a pinion 64 in mesh with the gear 51. The train of gears just described is so proportioned and arranged that the gear 51 is caused to make one complete revolution for each mile traveled by the vehicle. During each revolution of the gear 51 in the direction indicated by the arrow 53 thereon the stud or pin 50 engages the crank or arm 49 and rocks the shaft 48 against the action of a spring 54, (see Figs. 2 and 8,) so as to cause the crank or arm 47 to turn the pawl-carrying lever 44 in the direction indicated by the arrow 66, Fig. 5, thereby moving the push-pawl 40 backward a sufficient distance to engage the next succeeding tooth of the gear 36, so that when the stud or pin 50 passes out of engagement with the arm 49 the spring 54 will rotate the rock-shaft in the opposite direction, and thereby move the pointer $f$ over the dial $c$ one graduation of the set or scale $d$.

Provision is made for preventing the pointer $f$ being moved more than one graduation for each revolution of the gear 51, and this is accomplished, as herein shown, by means of an arm 72 on the lever 44, which is arranged to be interposed into the path of movement of the gear 36 at or about the time the push-pawl 40 has reached the end of its forward movement and the gear 36 has been moved the distance of one tooth by the spring 54. It will thus be seen that the push-pawl advances the pointer $f$ step by step and that the said pointer remains in the position into which it is moved until the stud or pin 50 again operates the crank or arm 49, which takes place at each mile traveled by the vehicle. It will also be seen that in the apparatus as thus far described two distinct readings are obtained—to wit, one indicative of the speed or rate at which the vehicle is traveling, given by the pointer $g$, and the other indicative of the distance covered by the vehicle, given by the pointer $f$. The dial $c$, provided with the distance-indicating scale or set of graduations $d$, is limited to a given number of graduations, depending upon the size of the dial and the space between the graduations.

In order to provide for a more extended indication of the distance traveled, a second distance registering or indicating device is provided, which comprises a series of disks 75, having numbers on their periphery arranged from "0" to "9" and which are mounted on the rock-shaft 48 in a manner as is well understood, so that the units disk or wheel is operated step by step for each complete revolution of the gear 51 and the tens disk or wheel is rotated one step for each complete revolution of the units wheel or disk, &c. The registering or counter mechanism just described is not herein shown in detail, as its construction is well understood. It will thus be seen that a double indication or registration of the mileage or distance traveled is obtained, one registering mechanism indicating a limited distance, shown in the present instance as a hundred miles, and the other indicating the aggregate or total distance traveled. The latter mechanism may be referred to as the totalizer.

Provision is made for setting the pointer $f$ to zero, which may be desired when starting on a run or trip, and for this purpose I have provided a hand-operated shaft 80, (see Fig. 5,) supported in suitable bearings under the plate 37 and provided, as herein shown, with a spur gear or pinion 81, which is normally disengaged from the gear 36 by a spring 82, but which is adapted to be engaged therewith by longitudinal movement of the shaft 80. When the pinion 81 is engaged with the gear 36, the locking pawl or arm 72 is disengaged from said gear, which may be effected, as herein shown, by the shaft 80 engaging a rod 84, attached to a sliding plate 85, having a pin or stud 86, which extends through an opening 87 in the plate 37 and engages the arm 46 of the pawl-carrying lever, so that longitudinal movement of the sliding bar 85 in the direction indicated by the arrow 90, Fig. 5, turns the lever 44 so as to disengage the locking arm or pawl 72 from the gear 36, and thus leaves the latter free to be turned by rotation of the shaft 80 to place the pointer $f$ at the zero indication on the scale $d$.

I have herein shown one construction of apparatus embodying this invention; but I do not desire to limit my invention to the particular construction shown. So, also, I have described my invention for use with vehicles; but I do not desire to limit my invention in this respect, as the instrument is equally well adapted for use with other rotatable devices or mechanisms whose speed it is desired to measure.

In operation with the apparatus herein shown the parts normally occupy the positions represented in Figs. 2, 4, and 6. When the vehicle is in motion, the rotation of the wheel $b$, through the connecting mechanism $i$, produces rotation of the shaft $h$, which shaft, through the gears $r$ $q$, rotates the shaft $p$ at a speed corresponding to the speed of the vehicle. As the shaft $p$ is rotated the weights of the centrifugal governor are thrown out after the manner represented in Fig. 10, which causes the loose collar $n$ to be moved longitudinally on the shaft $p$ against the action of the spring 10. As the loose collar $n$ is moved in the direction of the arrow 30, Fig. 10, the lever 12 is permitted to be moved on its pivot by its spring 15, the said lever following the movement of the collar $n$. As the lever 12 is moved from the position shown in Fig. 9 to that shown in Fig. 10 it permits the spring 23 to turn the pointer $g$, through the gears 20 21, and as the speed of the vehicle decreases the spring 10 moves the loose collar $n$ in the reverse direction, thereby moving the lever 12 backward or in the direction opposite to that indicated by the arrow 30, Fig. 10, which movement of the lever 12 causes the pointer $g$ to be moved in the reverse direction, through the pin 17, attached to the arm 18, which is connected with the shaft 19. At each mile traveled by the vehicle the pointer $f$ is moved one division of the set of graduations $d$, which is effected by means of the pin 50 operating the crank or arm 49 on the rock-shaft 48, and simultaneously with the movement of the pointer $f$ the distance of one graduation the totalizer 75 is operated by the rocking movement of the shaft 48.

I claim—

1. In an instrument of the class described, in combination, a dial provided with graduations, a pointer coöperating therewith, gearing to rotate said pointer, means to rotate said gearing, a lever controlling the operation of said means, a shaft operatively connected with the mechanism or vehicle whose speed is to be measured, a governor operated from said shaft and controlling the movement of said lever, a second pointer coöperating with said dial and concentric with the first-mentioned pointer, and mechanism operatively connected with said shaft to operate said second pointer step by step, substantially as described.

2. In an apparatus of the class described, in combination, a main shaft, a governor operatively connected therewith and comprising a weight, links pivoted thereto and extended in opposite directions, collars to which said links are pivoted, and a spring interposed between said collars, means to secure one of said collars to said shaft, a lever coöperating with the other of said collars and moved in one direction by said spring, means to move said lever in the opposite direction, a pointer or index, gearing connected to said pointer and actuated in one direction by movement of said lever, means to move said gearing in an opposite direction, said means being controlled by said lever, a second pointer concentric with the first-mentioned pointer, a train of gears connected with said main shaft, a stud or pin on one of said gears, a gear concentric with the first-mentioned pointer and to which said second pointer is connected to move therewith, and mechanism actuated by the said stud or pin for effecting a step-by-step rotation of the gear carrying said second pointer.

3. In an apparatus of the class described, in combination, a dial provided with graduations, a pointer coöperating therewith, a shaft to which said pointer is secured, gearing to rotate said shaft, a spring to operate said gearing in one direction, a lever controlling the action of said spring, a main shaft driven from the vehicle or mechanism whose speed is to be measured, a centrifugal governor responsive to the speed of said main shaft and controlling the movement of the said lever, a spring to act on said centrifugal governor and effect movement of said lever in a reverse direction, a second pointer, a gear loose on the shaft of the first-mentioned pointer and to which the second pointer is secured to move therewith, and mechanism operated from the main shaft to move said loose gear and its attached pointer step by step, substantially as described.

4. In an instrument of the class described, in combination, a dial provided with two concentric sets of graduations, a pointer coöperating with one of said sets of graduations to indicate the rate of travel of the vehicle or of the mechanism whose speed is to be measured, a second pointer concentric with the first-mentioned pointer and coöperating with the other set of graduations and movable step by step to indicate distance, a supporting-framework for said dial comprising a disk or plate to which said dial is secured, a bottom disk or plate and intermediate uprights attached to said disks or plates, a main or driving shaft supported by said framework between said disks or plates, a centrifugal governor supported by the framework between said disks and operated from said main shaft, mechanism for operating one of said pointers located between said disks and under the control of said centrifugal governor, and mechanism for moving the other of said pointers located between said disks and operatively connected with the main shaft below the upper of said disks and with the said pointer above the upper of said disks, substantially as described.

5. In an instrument of the class described, in combination, a dial provided with two concentric sets of graduations, a pointer coöperating with one of said sets of graduations to indicate the rate of travel of the vehicle or of the mechanism whose speed is to be measured, a second pointer concentric with the first-mentioned pointer and coöperating with the other set of graduations and movable step by step to indicate distance, a supporting-framework for said dial comprising a disk or plate to which said dial is secured, a bottom disk or plate and intermediate uprights attached to said disks or plates, a main or driving shaft supported by said framework between said disks or plates, a centrifugal governor supported by the framework between said disks and operated from said main shaft, mechanism for operating one of said pointers located between said disks and under the control of said centrifugal governor, a totalizer supported by the upper disk or plate, and mechanism for moving the said totalizer and the other of said pointers, said mechanism being supported by the framework below the upper of said disks and operatively connected with the other of said pointers above said upper disk, substantially as described.

6. In an apparatus of the class described, in combination, a main shaft, a governor operatively connected therewith and comprising a weight, links pivoted to said weight and extended in opposite directions, collars to which said links are pivoted, and a spring interposed between said collars, means to secure one of said collars to said shaft, a lever coöperating with the other of said collars and moved in one direction by said spring, a pointer or index, gearing connected to said pointer and actuated in one direction by movement of said lever, and means to move said gearing in the opposite direction, said means being controlled by the said lever, substantially as described.

7. In an apparatus of the class described, in combination, a supporting-frame comprising an upper disk, a lower disk substantially parallel therewith and intermediate uprights separating said disks, a dial secured to said upper disk and provided with concentric sets of graduations, a gear interposed between said dial and upper disk, a pointer located above said dial and secured to said gear to move therewith, said pointer coöperating with one set of graduations on said dial, a shaft extended through said gear and dial, a pointer secured to said shaft above said dial and coöperating with said second set of graduations on said dial, gearing connected with said shaft below said upper disk, a spring to turn said gearing in one direction, a lever pivotally mounted between said disks to move in a plane substantially parallel with said upper disk, an arm attached to said gearing and coöperating with said lever to permit the latter to control the action of said spring, a shaft supported between said disks substantially parallel therewith, a centrifugal governor mounted on said last-named shaft and with which said lever coöperates, a spring encircling said shaft to move said governor, lever, gearing, and pointer in one direction, a main shaft supported between said disks substantially parallel therewith, gearing to connect said main shaft with the governor-shaft, a train of gears supported between said disks and connected with said main shaft, a pin or projection on a gear of said train and mechanism actuated by said pin or projection for effecting intermittent rotation of the gear between the dial and upper disk and its attached pointer, substantially as described.

In testimony whereof I have signed my name to this specification in the presence of two subscribing witnesses.

LEON E. BLANCHARD.

Witnesses:
JAS. H. CHURCHILL,
J. MURPHY.